United States Patent [19]

Wakatsuki

[11] Patent Number: 4,852,701

[45] Date of Patent: Aug. 1, 1989

[54] REAR WHEEL BRAKING SYSTEM FOR MOTORCYCLE

[75] Inventor: Goroei Wakatsuki, Saitama, Japan

[73] Assignee: Honda Giken Kogyo Kabushiki Kaisha, Tokyo, Japan

[21] Appl. No.: 247,750

[22] Filed: Sep. 21, 1988

[30] Foreign Application Priority Data

Sep. 25, 1987 [JP] Japan .................. 62-241896

[51] Int. Cl.$^4$ .............................................. B60J 8/34
[52] U.S. Cl. .................................. 188/181 A; 303/113
[58] Field of Search ........... 188/181 A, 181 R, 181 C, 188/180; 303/113, 119, 116

[56] References Cited

U.S. PATENT DOCUMENTS

| 4,353,440 | 10/1982 | Farr | 188/181 A |
| 4,735,464 | 4/1988 | Tsuchida | 188/181 A |
| 4,766,982 | 8/1988 | Hayashi et al. | 188/181 A |

FOREIGN PATENT DOCUMENTS 0012549 1/1986 Japan .................. 188/181 A

Primary Examiner—Andres Kashnikow
Assistant Examiner—Matthew C. Graham
Attorney, Agent, or Firm—Lyon & Lyon

[57] ABSTRACT

In a motorcycle of the type including a transmission case provided on one side of a body frame, and a transmission and a gear type deceleration unit housed in the case for transmitting a driving force from an engine to an axle of the rear wheel an antilock controlling device for controlling a braking hydraulic pressure for the rear wheel includes a wheel deceleration sensor operatively connected with the rear wheel, and a casing for accommodating the antilock controlling device is attached to the transmission case. The wheel deceleration sensor includes a driving shaft having a pinion coupled thereto, and the pinion meshes with a final gear of the gear type deceleration unit. With this construction, there is no need of providing any exclusive overdrive device for the sensor, and a complication in the structure surrounding the rear wheel is avoided.

3 Claims, 6 Drawing Sheets

REAR WHEEL BRAKING SYSTEM FOR MOTORCYCLE

BACKGROUND OF THE INVENTION

In a vehicle such as a motorcycle equipped with an antilock control device, an inertia type wheel deceleration sensor is operatively connected to a wheel.

The inertia type wheel deceleration sensor is adapted to sensitively detect a variation in deceleration of a wheel by utilizing a rotation inertia force of a flywheel. Thus, it is necessary to rotate the flywheel at a speed higher than that of the wheel. In view of this fact, in a conventional braking system of the aforesaid kind, the wheel is jointed to a driving shaft for the sensor via an exclusively-used overdrive device (refer to, for instance, Japanese Patent Laid Open No. 120440/1981).

However, it has been found that when the braking system having the aforementioned type of overdrive device is applied to for example a rear wheel braking system for a motorcycle as it is, the overdrive device must be especially jointed to the rear wheel in addition to a transmission for driving the rear wheel. Thus, there arises a problem that a structure around the rear wheel becomes complicated.

SUMMARY OF THE INVENTION

In a vehicle such as a motorcycle, an axle connected to a hub of a rear wheel is rotatably supported at a rear end of a transmission case rearwardly extending from one side of an engine supported on a body frame. The transmission case accommodates a transmission connected to a crankshaft of the engine and a gear type deceleration unit connecting an outward shaft of the transmission to the axle. The braking apparatus is comprised of a master cylinder operated by a driver, a brake operated by an output hydraulic pressure of the master cylinder so as to apply a braking force to the rear wheel, and an antilock controlling device equipped therein with an inertia type wheel deceleration sensor operatively connected to the rear wheel, the controlling device being adapted to control a braking hydraulic pressure of the brake in response to an output from the wheel deceleration sensor. The present invention has been made with the foregoing in mind and an object residing in providing a rear wheel braking system which is simple in structure and reliable in function, and which assures that a flywheel in a wheel deceleration sensor is rotated at a speed higher than that of the rear wheel by utilizing a deceleration unit employed to drive the rear wheel.

To accomplish the above object, the present invention provides a system of the early-mentioned type wherein a casing in which the antilock controlling device is accommodated is attached to a transmission case and a pinion fixedly mounted on a driving shaft for the wheel deceleration sensor meshes with a final gear of the deceleration unit.

Among a group of gears in the deceleration unit for driving the rear wheel, the final gear has the largest diameter. With the aforementioned construction, the driving shaft for the wheel deceleration sensor is driven by the final gear via the pinion during travelling of the vehicle whereby it is rotated at a speed higher than that of the rear wheel. Accordingly, the final gear in the deceleration unit serves also as a driving gear having a large diameter for driving the wheel deceleration sensor. Owing to this arrangement, there is no need of providing a special overdrive device and thereby a complication of the structure around the rear wheel can be avoided.

These and other objects, features and advantages of the present invention will become readily apparent from reading of the following description which has been made in conjunction of the accompanying drawings.

BRIEF DESCRIPTION OF THE DRAWINGS

A preferred embodiment of the present invention will be illustrated in the following drawings in which.

DESCRIPTION OF THE PREFERRED EMBODIMENT

Now, the present invention will be described in detail hereunder with reference to the accompanying drawings which illustrate a preferred embodiment thereof.

Figure 1:
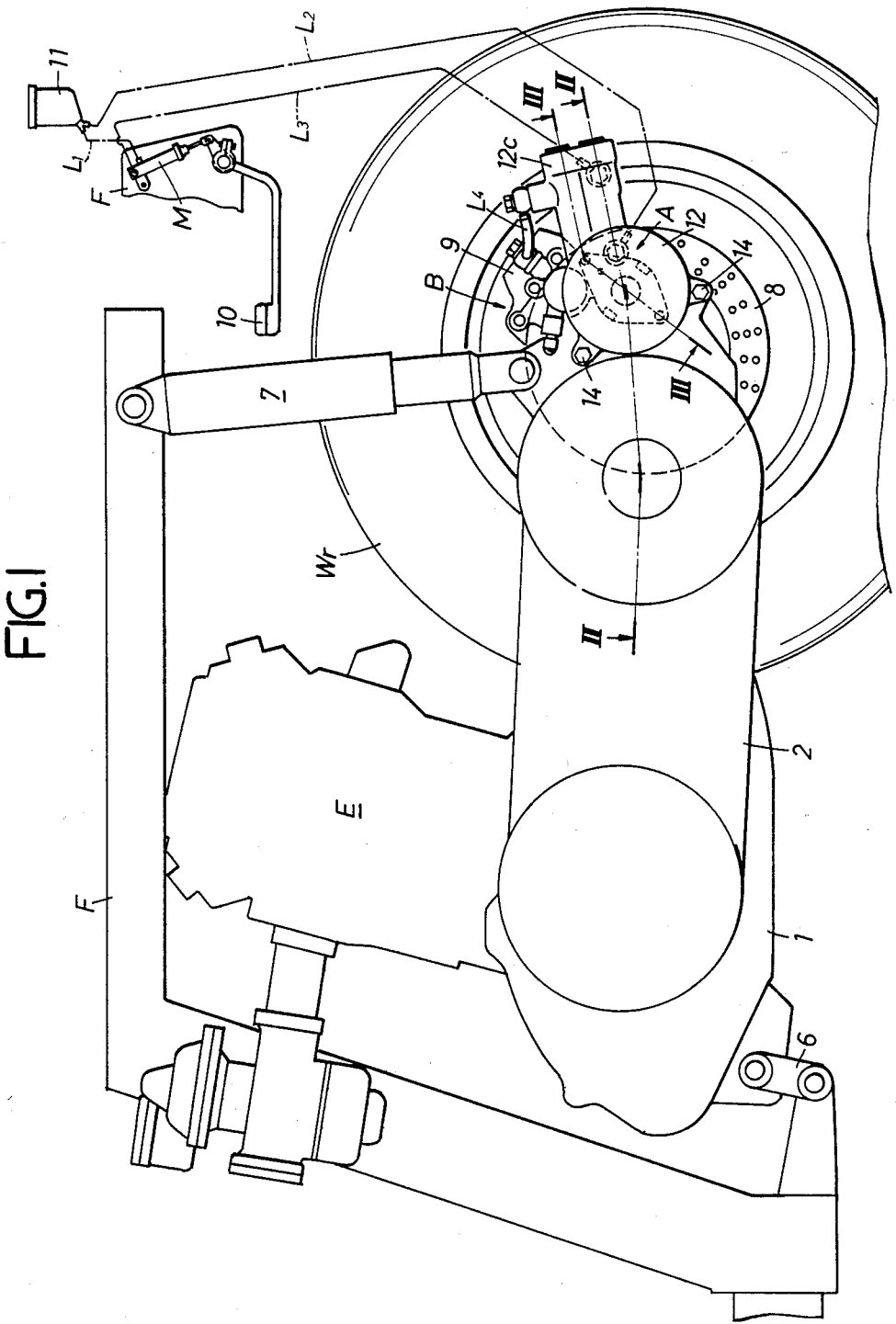
FIG. 1 is a side view of a rear portion of a motorcycle having a system according to the invention employed therefore.
Figure 2:
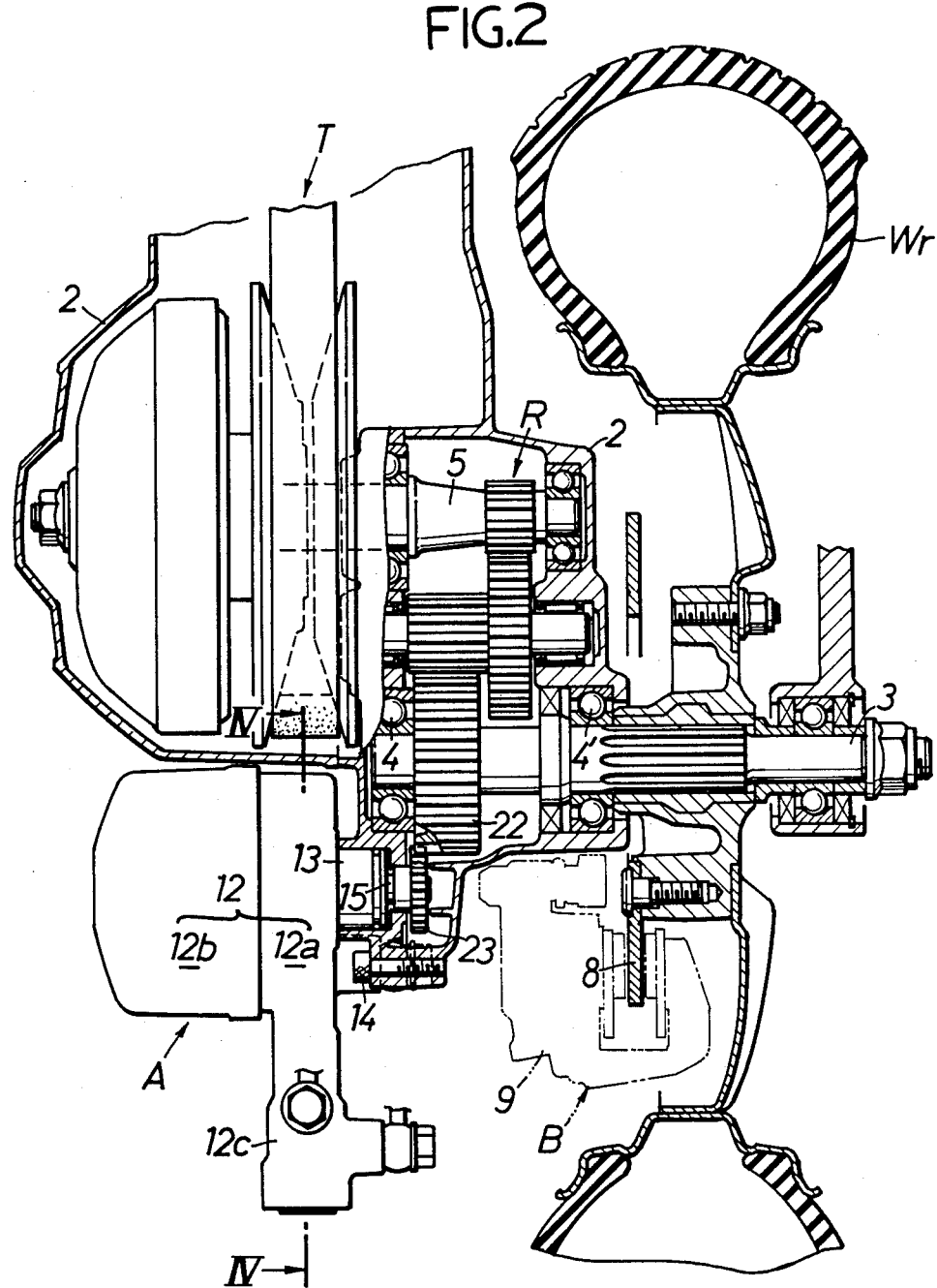
FIG. 2 is a sectional view of the system taken along line II—II in FIG. 1.

Referring first to FIGS. 1 and 2, a crankcase 1 for an engine E mounted on a body frame F of a scooter type motorcycle is connected with a rearwardly extending transmission case 2 on one side of the crankcase 1 and an axle 3 spline-connected to a hub of a rear wheel Wr is rotatably supported at the rear end of the transmission case 2 via a pair of left and right ball bearings 4 and 4'. In addition, a belt type continuously variable transmission T operatively connected to a crankshaft (not shown) of the engine E and a gear type deceleration unit R adapted to rotate the axle 3 at a reduced speed via an output shaft 5 of the transmission T are accommodated in the transmission case 2. In order to assure that the transmission case 2 freely rocks along with the rear wheel Wr in the vertical direction, the fore part of the crankcase 1 is supported on the body frame F via a link 6 and the rear end part of the transmission case 2 is connected to the body frame F via a damper 7.

A caliper 9 adapted to impart a braking force to the rear wheel Wr in cooperation with a rotor 8 secured to the hub of the rear wheel Wr and an antilock controlling device A for controlling a braking hydraulic pressure to be applied to the caliper 9 are arranged in association with the transmission case 2. Particularly, the antilock controlling device A is located rearwardly of the transmission T so as not to be adversely affected by collision with any foreign matter coming from the foreward side as viewed from the motorcycle and moreover it is located at a possibly high position so as not to be adversely affected by foreign matters scattered upwardly from the road surface. The rotor 8 and the caliper 9 as mentioned above constitute a known disc brake B.

Additionally, a master cylinder M to be operated by a brake pedal 10 and an oil reservoir 11 located upwardly of the master cylinder M are fitted to the body frame F.

The oil reservoir 11 is communicated with the master cylinder M via a first oil supply passage $L_1$, the master cylinder M is communicated with the antilock controlling device A via an upstream-side braking oil passage $L_3$, the antilock controlling device A is communicated with the caliper 9 for the disc brake B via a downstream-side braking oil passage $L_4$ and moreover the antilock controlling device A is communicated with the oil reservoir 11 via a second oil supply passage $L_2$. Owing to the communication established in this way, a working oil stored in the oil reservoir 11 is supplied to the master cylinder M and the antilock controlling device A and an output hydraulic pressure from the master cylinder M is applied to the caliper 9 of the disc brake B via the antilock controlling device A.

The antilock controlling device A includes a casing 12 which is comprised of a case body 12a having a locating boss 13 fitted into the outer wall of the transmission case 2 and secured thereto by means of bolts 14 and a cap-shaped cover 12b fitted onto the open end of the case body 12a. An extension portion 12c extending rearwardly of the rear surface of the case body 12a is made integral with the latter.

A driving shaft 15, a hydraulic pump 16, a modulator 17, a discharge valve 20 and a wheel deceleration sensor 21 are arranged in the casing 12.

The driving shaft 15 is supported by the casing 12 via bearings 19 and 19'. One end of the driving shaft 15 is protruded into the interior of the transmission case 2 and is spline-fitted thereat with a pinion 23 which meshes with a final gear 22 having the largest diameter among a group of gears of the deceleration unit R.

The hydraulic pump 16 comprises an eccentric cam 26 formed on the driving shaft 15 in a region located between both the bearings 19 and 19', a push rod 27 of which inner end is located opposite to the eccentric cam 26, a pump piston 28 placed in abutment against the outer end of the push rod 27, a working piston 29 placed in abutment against the outer end of the pump piston 28 and a return spring 30 for biasing the push rod 27 in a direction of moving away from the eccentric cam 26.

The push rod 27 and the pump piston 28 are slidably inserted in a first cylinder bore 33 in such a manner as to define an inlet chamber 31 and outlet chamber 32 around their outer peripheral surfaces. In addition, a plug 34 is threadably engaged with the outer end of the first cylinder bore 33 to define a pump chamber 35 between the pump piston 28 and the plug 34, and the working piston 29 is slidably inserted into the plug 34 to define a hydraulic chamber 36.

The inlet chamber 31 is communicated with the oil reservoir 11 via the second oil supply passage $L_2$ and is moreover communicated with the pump chamber 35 which in turn is communicated with the outlet chamber 32 via a one way seal member 39 adapted to function as a delivery valve. Additionally, the hydraulic chamber 36 is hydraulically connected to the upstream-side braking oil passage $L_3$ in such a manner that it is normally communicated with the output port of the brake master cylinder M.

The modulator 17 comprises a pressure reducing piston 46, a stationary piston 47 adapted to receive one end of the pressure reducing piston 46 to define a limit of backward movement thereof and a return spring 48 for biasing the pressure reducing piston 46 in a direction of coming in contact with the stationary piston 47. Both the pistons 46 and 47 are slidably inserted in a second cylinder bore 52 which is formed adjacent to the first cylinder bore 33 in the extension portion 12c.

The pressure reducing piston 46 defines a controlling hydraulic chamber 18 between it and the inner wall surface of the second cylinder bore 52 and moreover defines an output hydraulic chamber 55 between it and the stationary piston 47, while the stationary piston 47 defines an input hydraulic chamber 54 around the outer peripheral surface thereof. The input hydraulic chamber 54 is communicated with the hydraulic chamber 36 of the hydraulic pump 16 via a hydraulic passage 56 and the output hydraulic chamber 55 is hydraulically connected to the downstream-side braking oil passage $L_4$ so as to be normally communicated with the input port of the caliper 9. Further, the controlling hydraulic chamber 18 is communicated with the outlet chamber 32 of the hydraulic pump 16 via a hydraulic passage 57.

The stationary piston 47 is formed with a valve chamber 58 which is normally communicated with the input hydraulic chamber 54 and a valve bore 59 for allowing the valve chamber 58 to be communicated with the output hydraulic chamber 55 therethrough. A valve body 60 for opening and closing the valve bore 59 and a valve spring 61 for biasing the valve body 60 in a direction of closing the valve bore 59 are accommodated in the valve chamber 58. To open the valve body 60, a valve stem 62 is provided so as to extend through the valve bore 59. When the pressure reducing piston 46 assumes its position at a limit of its backward movement, the valve stem 62 thrusts the valve body 60 whereby the latter is brought in an opened state.

The outer opening of the second cylinder bore 52 is closed with a plug 63 which is threadably engaged with the extension portion 12c, and the stationary piston 47 is normally held at a position where it comes in contact with the plug 63, under the effect of resilient force of the return spring 48 or hydraulic pressure introduced into the input hydraulic chamber 54 and the output hydraulic chamber 55.

Figure 3:
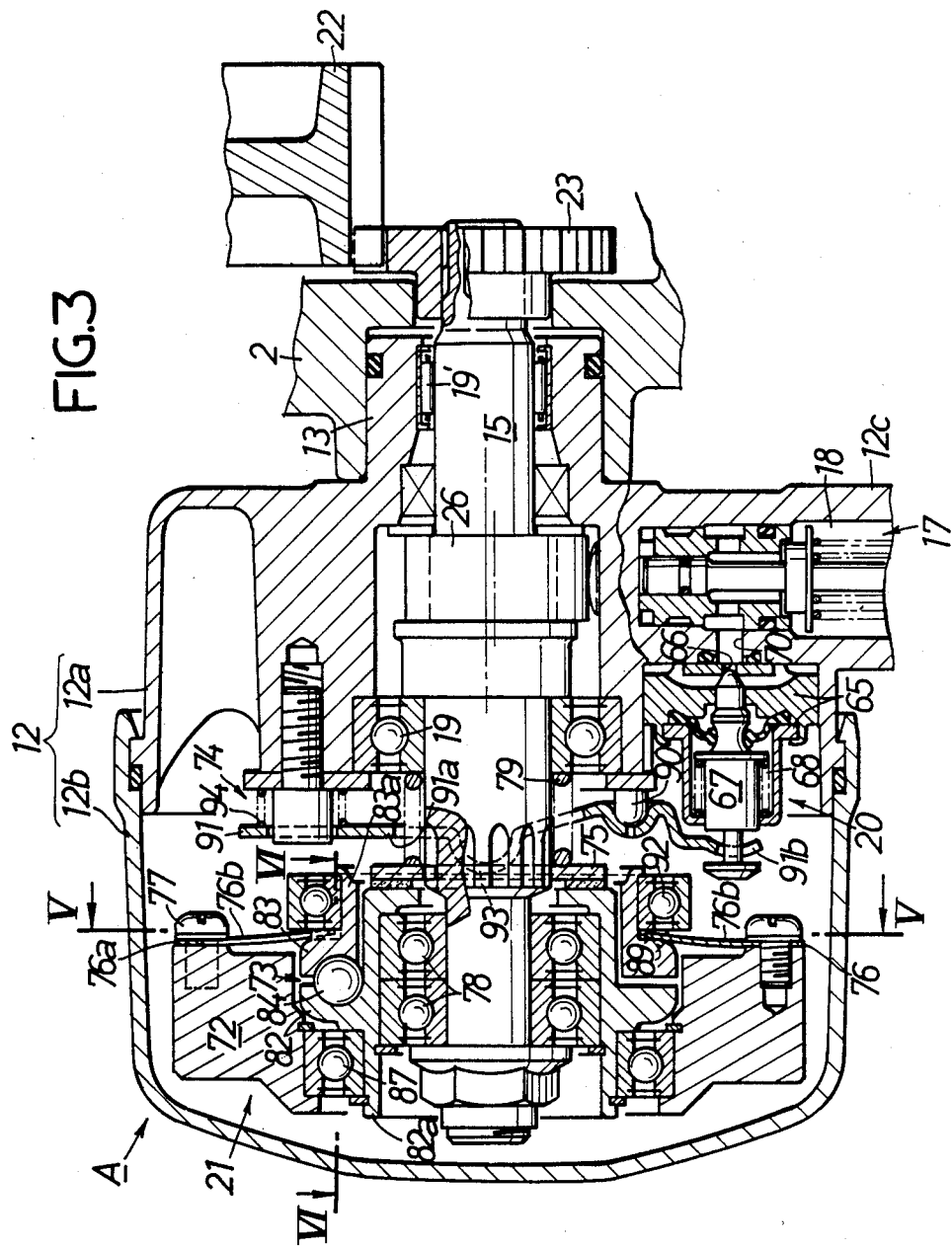
FIG. 3 is a sectional view of the system taken along line III—III in FIG. 1.
Figure 4:
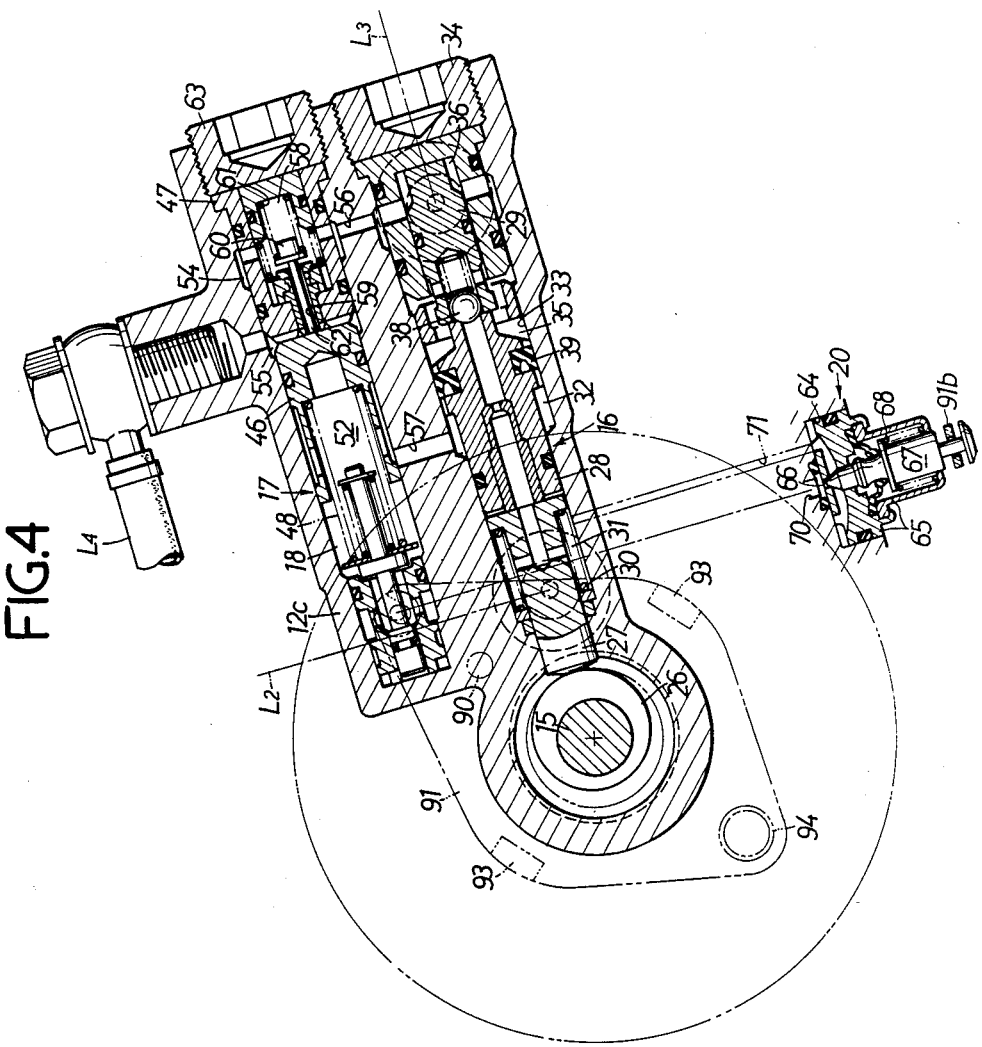
FIG. 4 is an enlarged sectional view of the system taken along line IV—IV in FIG. 2.
Figure 5:
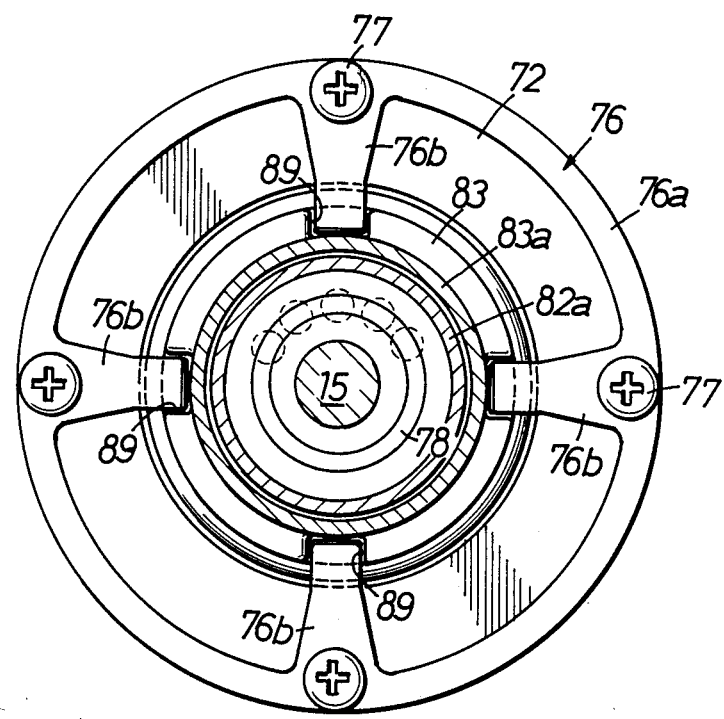
FIG. 5 is a sectional view of the system taken along line V—V in FIG. 3.
Figure 6:
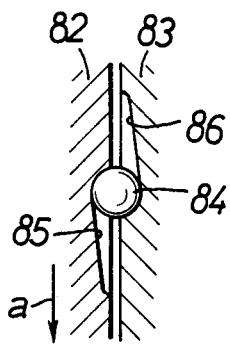
FIG. 6 is a fragmental sectional view of the system taken along line VI—VI in FIG. 3.
Figure 7:
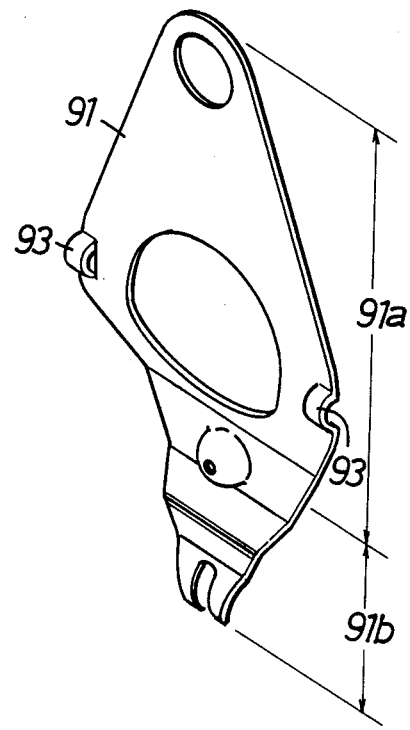
FIG. 7 is a perspective view of a lever for the antilock controlling device.

Referring to FIGS. 3 and 4, the pressure discharge valve 20 comprises a valve casing 65 fitted into a fitting recess 64 formed on the inner wall of the casing body 12a, a valve body 67 accommodated in the valve casing 65 to open or close a valve bore 66 and a valve spring 68 for resiliently biasing the valve body 67 in a direction of closing the valve bore 66.

The outer end of the valve bore 66 is communicated with the controlling hydraulic chamber 18 of the modulator 17 via a through hole 70 and the interior of the valve casing 65 leading to the inner end of the valve bore 66 is communicated with the inlet chamber 31 of the hydraulic pump 16 via a hydraulic passage 71. After all, it follows that the interior of the valve casing 65 is communicated with the oil reservoir 11.

Referring to FIGS. 3 to 7, the wheel deceleration sensor 21 includes a cam mechanism 73 adapted to be driven by the driving shaft 15 via a clutch plate 75, a flywheel 72 adapted to be driven by the cam mechanism 73 via a resilient driving member 76 and an output lever mechanism 74 for actuating the pressure discharge valve 20 in response to actuation of the cam mechanism 73 due to overrunning of the flywheel 72. All the above-mentioned components are accommodated in the casing 12.

The cam mechanism 73 comprises a driving cam plate 82 for rotatably but axially immovably supporting a boss 82a on the driving shaft 15 via ball bearings 78, a driven cam plate 83 located closer to the eccentric cam 26 from the driving plate 82 and located opposite to the plate 82 and a plurality of thrust balls 84 annularly arranged between both the cam plates 82 and 83. The clutch plate 75 spline-fitted onto the driving shaft 15 is brought in pressure contact with one end face of the boss 82a of the driving cam plate 82 under the effect of resilient force of a clutch spring 79.

A plurality of cam recesses 85 and 86 allowing the thrust balls 84 to be engaged therewith are provided on opposite surfaces of both the cam plates 82 and 83. Specifically, each of the cam recesses 85 on the driving cam plate 82 is inclined in such a manner that its bottom surface becomes shallower in a rotational direction a of the driving shaft 15, while each of the cam recesses 86 on the driven cam plate 83 is inclined in such a manner that its bottom surface becomes deeper in the rotational direction a. Accordingly, in a normal case where the driving cam plate 82 assumes a driving side with respect to the driven cam plate 83, the thrust balls 84 are brought in engagement with both the recesses 85 and 86 at their deepest positions so that the driving cam plate 82 transmits rotational torque received from the driving shaft 15 to the driven cam plate 83, causing no relative rotation to occur between both the cam plates 82 and 83. However, in a contrary case where the driven cam plate 83 overruns with respect to the driving cam plate 82, the result is that relative rotation occurs between both the cam plates 82 and 83 and thereby the thrust balls 84 roll and climb the inclined bottom surfaces of the cam recesses 85 and 86. This causes a certain intensity of thrust force to be imparted to both the cam plates 82 and 83 whereby the driven cam plate 83 is axially displaced away from the driving cam plate 82.

The flywheel 72 is supported on the boss 82a of the driving cam plate 82 on the opposite side to the driven cam plate 83 so as to be rotatable relative to the boss 82a via a ball bearing 87 but against movement in the axial direction. Additionally, the flywheel 72 is connected to the driven cam 83 via the driving member 76.

The driving member 76 is made of elastic material such as spring steel plate, synthetic resin or the like material and comprises an annular plate 76a and a plurality of driving pawls 76b projecting radially inwardly of the inner periphery of the annular plate 76a. Each of the driving pawls 76b has such a flexibility that it can flex only in the axial direction of the flywheel 72. When the flywheel 72 is connected to the driven cam plate 83, the annular plate 76a is secured to the side surface of the flywheel 72 by using bolts 77 and the driving pawls 76b are engaged with radially extending grooves 89 on the outer side surface of the driven cam plate 83. To prevent the driving pawls 76b from being disengaged from the grooves 89, an inner race of a ball bearing 92 to be described later is fitted onto the boss 83a of the driven cam plate 83.

The output lever mechanism 74 includes a support column 90 projecting from the inner end surface of the case body 12a at an intermediate position between the driving shaft 15 and the pressure discharge valve 20 and a lever 91 supported by a semispherical fulcrum portion formed at the foremost end of the support shaft 90 so as to be swingable in the axial direction of the driving shaft 15. The lever 91 comprises a first arm 91a extending from the support column 90 while bypassing the driving shaft 15 and a second arm 91b extending from the support column 90 toward the pressure discharge valve 20. Additionally, a semispherical abutment portions 93 formed at an intermediate portion of the first arm 91a are brought in engagement with the driven cam plate 83 via the ball bearing 92.

A set spring 94 for resiliently biasing the first arm 91a toward the ball bearing 92 side is provided between the foremost end of the first arm 91a and the case body 12a, and the foremost end of the second arm 91b is jointed to the valve disc body of the pressure discharge valve 20 with a predetermined amount of play kept therefore.

A resilient force imparted to the lever 91 by the set spring 94 permits the abutment portions 93 on the first arm 91a to abut against the outer race of the ball bearing 92. This allows the lever 91 to be normally parted away from the valve body 67 of the pressure discharge valve 20 whereby the latter is maintained in a closed state. The biasing force imparted to the ball bearing 92 by the set spring 94 functions to urge the driven cam plate 83 toward the driving cam plate 82.

Next, operation of this embodiment will be described below.

While a vehicle travels, the final gear 22 in the deceleration unit R directly rotates the axle 3 of the rear wheel Wr and moreover rotates the pinion 23 on the driving shaft 15 at an increased speed. The rotational torque generated by the pinion 23 is transmitted to the flywheel 72 via the driving shaft 15, the clutch plate 75, the driving cam plate 82, the thrust balls 84, the driven cam plate 83 and the driving member 76 to rotate the flywheel 72 at a speed higher than that of the rear wheel Wr. This leads to a result that the flywheel 72 has a large rotational inertia force.

Now, when the master cylinder M is actuated to brake the rear wheel Wr by depressing the brake pedal 10, an output hydraulic pressure from the master cylinder M is transmitted to the disc brake B via the upstream-side braking oil passage $L_3$, the hydraulic chamber 36 in the hydraulic pump 16, the input hydraulic chamber 54 in the modulator 17, the valve chamber 58, the valve bore 59, the output hydraulic chamber 55 and the downstream-side braking oil passage $L_4$ so that a braking force can be imparted to the rear wheel Wr.

On the other hand, since the output hydraulic pressure from the master cylinder M is introduced into the hydraulic chamber 36 in the hydraulic pump 16, a reciprocal movement is imparted to the pump piston 28 by a biasing function given to the working piston 29 under the effect of the hydraulic pressure as well as a lifting function of the eccentric cam 26 given to the push rod 27. During a suction stroke in which the pump piston 28 moves to the push rod 27 side, the suction valve 38 is caused to open so that an oil in the oil reservoir 11 is introduced into the pump chamber 35 via the second oil supply passage $L_2$ and the inlet chamber 31. During a delivery stroke in which the pump piston 28 is displaced toward the working piston 29 side, the one-way seal member 39 is opened so that an oil in the pump chamber 35 is pumped to the output chamber 32 and then to the controlling hydraulic chamber 18 in the modulator 17 via the hydraulic passage 57. When a pressure in the outlet chamber 32 and the controlling hydraulic chamber 18 is increased to a predetermined value, the pump piston 28 is held along with the working piston 29 at an abutment position against the plug 34, under the effect of hydraulic pressure in the outlet chamber 32.

Here, since communication between the controlling hydraulic chamber 18 in the modulator 17 and the oil reservoir 11 is initially interrupted due to closing of the pressure discharge valve 20, a hydraulic pressure fed to the controlling hydraulic chamber 18 from the hydraulic pump 16 acts directly on the pressure reducing piston 46 to forcibly displace the latter to its rearward position and thereby the valve body 60 is maintained in an opened state by means of the valve stem 62. This permits an output hydraulic pressure from the master cylinder M to pass through the valve bore 59.

Accordingly, in a normal braking state, a braking force to be applied to the disc brake B is in proportion to an output hydraulic pressure from the master cylinder M.

When an angular deceleration (namely, a negative angular acceleration) is produced on the rear wheel Wr during such braking operation, the flywheel 72 which has sensed that condition tends to perform overrunning rotation along with the driven cam plate 83 with respect to the driving shaft 15 under the effect of its rotational inertia force. Namely, a relative rotation tends to occur between both the cam plates 82 and 83. However, at a stage where there is no possibility that the rear wheel Wr is locked, the rear wheel Wr has a low angular deceleration and thereby the relative rotation between both the cam plates 82 and 83 is suppressed under the influence of a set load of the set spring 94.

When the rear wheel Wr is liable to be locked due to an excessively increased braking force or a reduced frictional coefficient of the road surface, this causes an angular deceleration of the rear wheel Wr to exceed a predetermined value, resulting in a relative rotation being produced between both the cam plates 82 and 83 by a rotational inertia force of the flywheel 72. Thus, a thrusting force caused by rolling of the thrust balls 84 exceeds the set load of the set spring 94 whereby the driven cam plate 83 is axially displaced toward the lever 91 side.

At this moment, the driving pawls 76b are caused to flex in response to the driven cam plate 83 being displaced in the axial direction. Thus, there is no need of allowing the flywheel 72 having a high magnitude of inertia mass to be displaced in the axial direction. Accordingly, the driven cam plate 83 can reliably respond to a thrusting force greater than a specified level which has been produced between both the cam plates 82 and 83, while preventing a delay in actuation of the cam mechanism 73. Additionally, the output lever mechanism 74 can be actuated quickly.

In response to the axial displacement of the driven cam plate 83, the lever 91 is caused to turn about the support column 90 serving as a fulcrum in such a manner as to compress the set spring 94 whereby the valve body 67 of the pressure discharge valve 20 is moved leftward against a resilient force of the valve spring 68. Consequently, the pressure discharge valve 20 assumes an opened state.

After an axial displacement of the driven cam plate 83, if the rotational torque caused by the inertia of the flywheel 72 is in excess of the transmission torque specified for the clutch plate 75, a slippage occurs between the driving cam plate 82 and the clutch plate 75 and the flywheel 72 continues overrunning rotation with respect to the driving shaft 15 along with the cam mechanism 73. This assures that transmission of any excessive load to the cam mechanism 73 or the like can be interrupted.

When the pressure discharge valve 20 is opened, the hydraulic pressure in the controlling hydraulic chamber 18 is released to the oil reservoir 11 via the through hole 70, the valve bore 66, the interior of the valve casing 65, the oil passage 71, the inlet chamber 31 of the hydraulic pump 16 and the second oil supply passage $L_2$ whereby the pressure reducing piston 46 is displaced toward the control hydraulic chamber 18 side against the resilient force of the return spring 48. This permits the valve body 60 to be closed by retraction of the valve stem 62 so that communication between the input hydraulic chamber 54 and the output hydraulic chamber 55 is interrupted and the volume of the output hydraulic chamber 55 is increased. As a result, the braking hydraulic pressure applied to the disc brake B is reduced, followed by a decrease in braking force for the rear wheel Wr so that an occurrence of locking phenomenon at the rear wheel Wr can be avoided. Then, as the rear wheel Wr restores its rotating state, the thrusting force imparted to the lever 91 via the cam mechanism 73 is released and thereby the lever 91 returns to its original position under the effect of resilient force of the set spring 94, resulting in the pressure discharge valve 20 being kept in a closed state.

Once the pressure discharge valve 20 is closed, a hydraulic oil delivered from the hydraulic pump 16 is promptly enclosed in the controlling hydraulic chamber 18, causing the pressure reducing piston 46 to be displaced rearwardly toward the output hydraulic chamber 55 side to increase a hydraulic pressure in the output hydraulic chamber 55. Otherwise, the pressure reducing piston 46 thrusts the valve body 60 upwardly to open the latter so that an output hydraulic pressure from the master cylinder M is transmitted to the output hydraulic chamber 55 and thereby a braking force is restored. Since the aforementioned operations are repeated at a high speed, the rear wheel Wr can be braked at a high efficiency.

What is claimed is:

1. A rear wheel braking system for a motorcycle in which an axle connected to a hub of a rear wheel of the motorcycle is rotatably supported at a rear end of a transmission case rearwardly extending from one side of an engine supported on a body frame, and a transmission connected to a crankshaft of said engine and a gear type deceleration unit connecting an output shaft of said transmission to said axle are accommodated in said transmission case, said rear wheel braking system comprising a master cylinder operated by a driver, a brake operated by an output hydraulic pressure of said master cylinder so as to apply a braking force to said rear wheel, and an antilock controlling device equipped therein with an inertia type wheel deceleration sensor which is operatively connected to said rear wheel so as to control a braking hydraulic pressure in response to an output of said wheel deceleration sensor, a casing for accommodating said antilock controlling device being mounted on said transmission case and a pinion coupled to a driving shaft of said sensor being meshed with a final gear of said deceleration unit.

2. The system of claim 1, wherein said casing is mounted to a rear part of said transmission case in such a manner that said casing is covered with said transmission case from a front side of said body frame, and said pinion meshes with said final gear of said deceleration unit at a position rearwardly of said final gear.

3. The system of claim 2, wherein said casing comprises a case body for accommodating said wheel deceleration sensor therein and an extension portion extending from one surface of said case body and accommodating therein a hydraulic pump and a modulator of said antilock controlling device, said case body being arranged adjacent to said transmission case, and said extension portion extending rearwardly from said case body to a rear side of said body frame.

* * * * *